March 18, 1958 F. A. MORRIS 2,827,519
SUBSCRIBER LINE RINGING IN AN ELECTRONIC TELEPHONE SYSTEM
Filed May 16, 1955
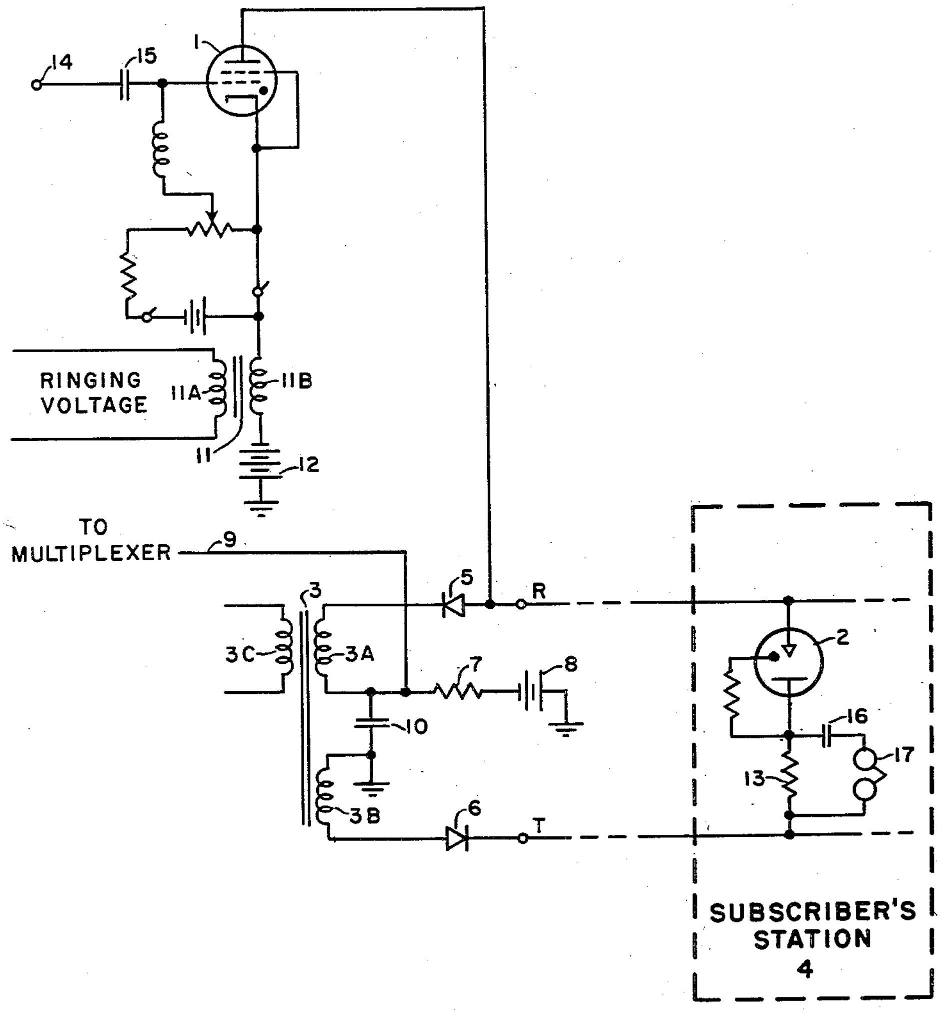
INVENTOR.
FRANK A. MORRIS
BY F. H. Henson
AGENT United States Patent Office 2,827,519
Patented Mar. 18, 1958

2,827,519

SUBSCRIBER LINE RINGING IN AN ELECTRONIC TELEPHONE SYSTEM

Frank A. Morris, Rochester, N. Y., assignor, by mesne assignments, to General Dynamics Corporation, a corporation of Delaware Application May 16, 1955, Serial No. 508,483

4 Claims. (Cl. 179—84)

This invention relates in general to electronic telephone systems, and more particularly to the ringing of subscribers' stations in electronic telephone systems. Electronic telephone systems in which the disclosed arrangement may be employed are shown and described in the copending applications of Robert B. Trousdale, Serial No. 301,215, filed July 28, 1952, and Serial No. 492,064, filed March 4, 1955. These copending applications are assigned to the same assignee as the present invention.

In an electronic telephone system it is conventional for the subscriber's station to terminate in a transformer in the associated line circuit. Battery feed is supplied to the substation through the windings of the transformer and ringing current is isolated from the transformer and the battery feed by means of diodes or rectifiers in the line conductors.

As is well known in the telephone art, the ringer at the substation is conventionally connected in series with either a capacitor or a gas tube across the line. In electronic telephone systems ringing voltage, superimposed on battery potential, is applied to the lines through either thyratrons or cold cathode gas tubes. If a capacitor is used in series with the ringer, the capacitor charges to the peak voltage of the ringing supply after a few cycles of ringing, if no means for discharging the capacitor is provided, and further ringing is impossible. This condition is brought about because the thyratron or gas tube is essentially a unidirectional conducting device and is turned off at some point during the positive swing of the ringing voltage. Furthermore, the capacitor cannot discharge while the tube is non-conducting because of the inclusion of the diodes or rectifiers in the line conductors.

If a gas tube is used in series with the ringer, the D.-C. component of the ringing voltage flows through the ringer. It has been found that the heavy D.-C. component of the electronic ringing voltage, due to the superimposing voltage seriously affects the tuning and sensitivity of a conventional harmonic ringer.

Accordingly, it is the general object of this invention to provide a new and improved electronic telephone system.

It is a more particular object of this invention to provide a new and improved means for ringing subscribers' stations in an electronic telephone system.

According to the present invention, a gas tube and resistor are connected in series across the line at the subscriber's station and the series connected capacitor and ringer are connected in parallel with the resistor. Since the gas tube is a constant voltage drop device, all of the A.-C. ringing signal appears across the resistor. By bridging the resistor with the ringer in series with the capacitor, only the A.-C. component of the ringing signal will go through the ringer. The resistor also serves to discharge the capacitor during the portion of the ringing cycle in which the tube is non-conductive.

Further objects and advantages of the invention will become apparent as the following description proceeds, and features of novelty which characterize the invention are set forth in particularity in the claims annexed to and forming a part of this specification.

For a better understanding of the invention, reference may be had to the accompanying drawing which shows the essential elements of a line circuit for applying ringing current to a subscriber line.

As illustrated, the line circuit comprises a speech transformer 3 which is connected by tip and ring conductors T and R, respectively, to subscriber's station 4. Although just one subscriber's station has been shown, it is to be understood that there may be several parties on the same line. Battery feed is supplied to the stations on the line over a circuit extending from ground through transformer winding 3B, diode 6, over the tip conductor T, through the subset transmitter and receiver (not shown), over the ring conductor R, through diode 5, transformer winding 3A, and through supervisory resistor 7 to battery 8, which may be 48 volts. The diffused junction germanium diodes 5 and 6, which may be type 1N–93, are poled so as to conduct. It is to be noted that when no party on the line is off-hook, no current flows through supervisory resistor 7, and conductor 9, which extends to the multiplexer, stands at —48 volts. When a subscriber on the line either initiates or answers a call, a loop is closed at the station and current flows through resistor 7. The potential of conductor 9 drops in accordance with the voltage drop across resistor 7 to enable the multiplexer to generate pulses in the time position of the line, as fully described in the above-identified copending applications. Talking signals appear across windings 3A and 3B, are induced in secondary winding 3C, and coupled to succeeding circuits. Capacitor 10 by-passes the supervisory resistor to voice frequencies but permits dial impulses to appear across the resistor and hence on conductor 9.

When any one of the subscribers' stations on the illustrated line is called, thyratron tube 1, which may be type 2D21, is utilized to connect ringing voltage of the proper frequency to conductor R. Ringing voltage of first one harmonic frequency and then another appears in sequence across primary winding 11A of transformer 11 and is induced in secondary winding 11B, superimposed on battery 12, which should be equal to the sustaining voltage of tube 1 plus the sustaining voltage of tube 2 or approximately 80 volts, and applied to the cathode and shield grid of tube 1. Thyratron 1 does not fire until triggering or operating signals, which may be at a frequency of 100 kc., for example, are connected over conductor 14 and coupled through capacitor 15 to the grid of tube 1. Triggering signals are applied to conductor 14 at the same time that the ringing frequency corresponding to the selected called station is applied to transformer 11 so that tube 1 conducts only during that interval of time. The generation and application of triggering signals is described in detail in the above-identified copending applications.

When triggering signals are present, tube 1 fires during the negative excursion of the ringing voltage and current is conducted through tube 1, over conductor R, through gas tube 2, which may be type 333A, the parallel combination of resistor 13 and capacitor 16 and ringer 17 in series, over conductor T, through diode 6, and winding 3B of transformer 3 to ground. As previously stated, the gas tube 2 is a constant voltage drop device and all of the A.-C. ringing signal appears across resistor 13. By bridging resistor 13 with ringer 17 in series with capacitor 16, only the A.-C. component of the ringing signal will go through the ringer. Tube 1 is rendered non-conductive during the positive excursion of each cycle of the ringing voltage when the voltage across the tube drops below the sustaining voltage of approximately 12 volts. When tube 1 is rendered non-conductive, tube 2 is, of course, rendered non-conductive and any charge built up on capacitor 16 is dissipated in resistor 13. The value of resistance used for resistor 13 depends upon the ringing frequency, the impedance of the ringer, and the size of the capacitor but, in general, the time constant must be such as to permit the charge on capacitor 16 to be dissipated during the portion of the ringing cycle when tube 2 is rendered non-conductive. Resistor 13 adds to the ringing load but, since it is out of phase with the load of the ringer and capacitor, it does not add directly.

While there has been disclosed what is at present considered to be the preferred embodiment of the invention, other modifications will readily occur to those skilled in the art. For example, it will be obvious to those skilled in the art that the gas tube 2, resistor 13, capacitor 16, and ringer 17 combination may be connected from one side of the line to ground at the substation for divided line ringing rather than being returned to ground over the tip conductor T for bridged ringing. It is not, therefore, desired that the invention be limited to the specific arrangement shown and described, and it is intended in the appended claims to cover all such modifications as fall within the true spirit and scope of the invention.

What is claimed is:

1. In a telephone system, a subscriber station terminating a two conductor line, said subscriber station including an electron discharge device and an impedance element connected in series between one conductor of the line and ground, a series connected capacitor and ringer connected in parallel with said impedance element, a source of cyclic ringing current, means for connecting said source of ringing current to said one conductor during a portion of each ringing cycle, said electron discharge device being rendered conductive during each ringing cycle responsive to the connection of said ringing source to said one conductor for permitting ringing current to flow through said ringer, and said impedance element being effective to discharge said capacitor during the portion of each ringing cycle in which said discharge device is non-conductive.

2. The telephone system of claim 1 in which the impedance element is a resistor.

3. In a telephone system, a subscriber station terminating a two conductor line, said subscriber station including an electron discharge device and an impedance element connected in series between said two line conductors, a series connected capacitor and ringer connected in parallel with said impedance element, a source of cyclic ringing current, means for connecting said source of ringing current to said line during a portion of each ringing cycle, said electron discharge device being rendered conductive during each ringing cycle responsive to the connection of said ringing source to said line for permitting ringing current to flow through said ringer, and said impedance element being effective to discharge said capacitor during the portion of each ringing cycle in which said discharge device is non-conductive.

4. The telephone system of claim 3 in which said impedance element is a resistor.

References Cited in the file of this patent

UNITED STATES PATENTS

| | | |
|---|---|---|
| 1,023,482 | Scribner | Apr. 16, 1912 |
| 2,069,915 | Edwards et al. | Feb. 9, 1937 |